(12) United States Patent
Ota et al.

(10) Patent No.: US 11,430,993 B2
(45) Date of Patent: Aug. 30, 2022

(54) ELECTRODE OF NONAQUEOUS ELECTROLYTE SECONDARY BATTERY, NONAQUEOUS ELECTROLYTE SECONDARY BATTERY, METHOD FOR PRODUCING ELECTRODE, AND METHOD FOR PRODUCING NONAQUEOUS ELECTROLYTE SECONDARY BATTERY

(71) Applicant: SANYO Electric Co., Ltd., Daito (JP)

(72) Inventors: Keisuke Ota, Hyogo (JP); Hiroshi Matsuyama, Hyogo (JP); Haruya Nakai, Hyogo (JP)

(73) Assignee: SANYO Electric Co., Ltd., Daito (JP)

( * ) Notice: Subject to any disclaimer, the term of this patent is extended or adjusted under 35 U.S.C. 154(b) by 329 days.

(21) Appl. No.: 16/725,570

(22) Filed: Dec. 23, 2019

(65) Prior Publication Data

US 2020/0259182 A1  Aug. 13, 2020

(30) Foreign Application Priority Data

Feb. 8, 2019 (JP) .............................. JP2019-021393

(51) Int. Cl.
*H01M 4/62* (2006.01)

(52) U.S. Cl.
CPC .................................. *H01M 4/625* (2013.01)

(58) Field of Classification Search
None
See application file for complete search history.

(56) References Cited

U.S. PATENT DOCUMENTS 10,164,260 B2 * 12/2018 Hanazaki ............ H01M 4/1391
2015/0311533 A1   10/2015 Tachibana et al.
2019/0221850 A1    7/2019 Tachibana et al.

FOREIGN PATENT DOCUMENTS

| JP | 2007-165079 A | 6/2007 |
| JP | 2009-252683 A | 10/2009 |
| JP | 2012-119078 A | 6/2012 |
| JP | 2014-194927 A | 10/2014 |

* cited by examiner

*Primary Examiner* — Carlos Barcena
(74) *Attorney, Agent, or Firm* — WHDA, LLP (57) ABSTRACT

A positive electrode includes a positive electrode substrate and a positive electrode active material layer disposed on at least one surface of the positive electrode substrate. The positive electrode active material layer contains a positive electrode active material, a binder, and an electroconductive agent. The positive electrode active material layer contains, as the electroconductive agent, a string-shaped agglomerate formed of fibrous carbons gathered and entangled with each other. The agglomerate has a length of 30 μm or more.

15 Claims, 7 Drawing Sheets

ELECTRODE OF NONAQUEOUS ELECTROLYTE SECONDARY BATTERY, NONAQUEOUS ELECTROLYTE SECONDARY BATTERY, METHOD FOR PRODUCING ELECTRODE, AND METHOD FOR PRODUCING NONAQUEOUS ELECTROLYTE SECONDARY BATTERY

CROSS REFERENCE TO RELATED APPLICATIONS

The present invention application claims priority to Japanese Patent Application No. 2019-021393 filed in the Japan Patent Office on Feb. 8, 2019, the entire contents of which are incorporated herein by reference.

BACKGROUND OF THE INVENTION

Field of the Invention

The present disclosure relates to an electrode of a nonaqueous electrolyte secondary battery and a method for producing the electrode. The present disclosure also relates to a nonaqueous electrolyte secondary battery and a method for producing the nonaqueous electrolyte secondary battery.

Description of Related Art

Japanese Published Unexamined Patent Application No. 2014-194927 (Patent Document 1) describes a method for producing an electrode of a nonaqueous electrolyte secondary battery.

In the method for producing an electrode, an active material, a binder, and an electroconductive material are mixed together and stirred, and thereafter a binder is added and stirred again to produce an active material slurry to be applied to a substrate.

In a nonaqueous electrolyte secondary battery including an electrode produced by such a method, electronic conductivity in an active material layer formed on a substrate may decrease, thereby decreasing the battery power.

The present disclosure provides an electrode of a nonaqueous electrolyte secondary battery in which the active material layer is likely to have high electronic conductivity and which is likely to have high battery power, and provides a method for producing the electrode. The present disclosure provides a nonaqueous electrolyte secondary battery in which the active material layer is likely to have high electronic conductivity and which is likely to have high battery power, and provides a method for producing the nonaqueous electrolyte secondary battery.

BRIEF SUMMARY OF THE INVENTION

To achieve the above objects, an electrode according to the present disclosure of a nonaqueous electrolyte secondary battery includes a substrate and an active material layer disposed on at least one surface of the substrate. The active material layer contains an active material, a binder, and an electroconductive agent. The active material layer contains, as the electroconductive agent, a string-shaped agglomerate formed of fibrous carbons gathered and entangled with each other. The agglomerate has a length of 30 µm or more.

A method according to the present disclosure for producing an electrode of a nonaqueous electrolyte secondary battery includes a first stirring step of mixing and stirring an active material, an electroconductive agent, a binder, and a dispersion medium to produce a temporary active material slurry and a second stirring step of adding an electroconductive agent to the temporary active material slurry and performing stirring after the first stirring step.

Carbon particles are linearly connected to each other to form a fibrous carbon. Fibrous carbons are gathered and entangled with each other to form a string-shaped agglomerate. The string-shaped agglomerate may include a branched portion. In the present specification, the length of the string-shaped agglomerate without a branched portion is defined as the distance from one end to the other end of the string-shaped agglomerate. The length of the string-shaped agglomerate with one or more branched portions is defined as the length of the longest portion of the string-shaped agglomerate. The agglomerate preferably has a minimum outer diameter of 40 nm or more. The agglomerate may have a hollow inside.

Observation of a cross section of the active material layer under a scanning electron microscope (SEM) reveals the agglomerate as an aggregation of string-shaped carbon materials. Herein, the minimum width of the string-shaped agglomerate in the cross section observed under a scanning electron microscope is defined as the minimum outer diameter of the agglomerate. Thus, the minimum outer diameter of the agglomerate can be determined by observing a cross section of the active material layer under a scanning electron microscope.

According to an electrode of a nonaqueous electrolyte secondary battery, a nonaqueous electrolyte secondary battery, a method for producing the electrode, and a method for producing the nonaqueous electrolyte secondary battery, according to the present disclosure, the active material layer is likely to have high electronic conductivity and the nonaqueous electrolyte secondary battery is likely to have high battery power.

DETAILED DESCRIPTION OF THE INVENTION

Hereinafter, embodiments according to the present disclosure will be fully described in accordance with the attached drawings. When plural embodiments and modifications are described hereinafter, producing a new embodiment by appropriately combining characteristic parts of the embodiments and modifications is expected from the beginning. In Examples described hereinafter, the same components are denoted by the same symbols, and redundant explanations are thus omitted. In the drawings, schematic views are included, and thus, the ratio of dimensions, such as width, length, and height, of a member in a figure is not always the same as the ratio of dimensions of the member in a different figure. Hereinafter, a prismatic secondary battery 10 including a wound electrode body 14 will be described as an example of the nonaqueous electrolyte secondary battery; however, the nonaqueous electrolyte secondary battery may be a prismatic secondary battery including a stacked electrode body or a cylindrical secondary battery. Among components described hereinafter, components not described in an independent claim showing the broadest concept are optional and not essential.

Figure 1:
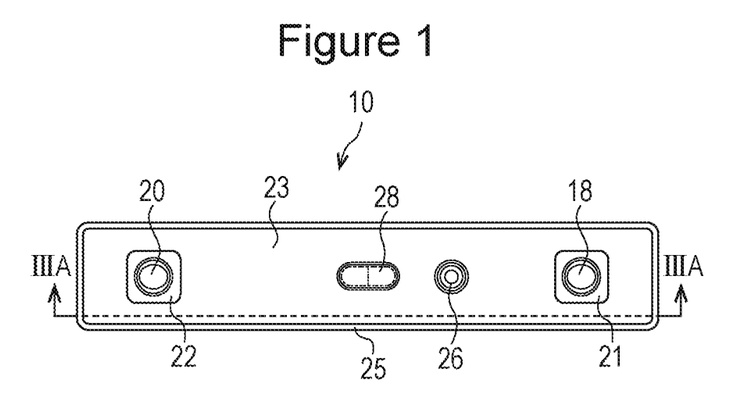
FIG. 1 is a plan view of a prismatic secondary battery according to an embodiment of a nonaqueous electrolyte secondary battery of the present disclosure.
Figure 2:
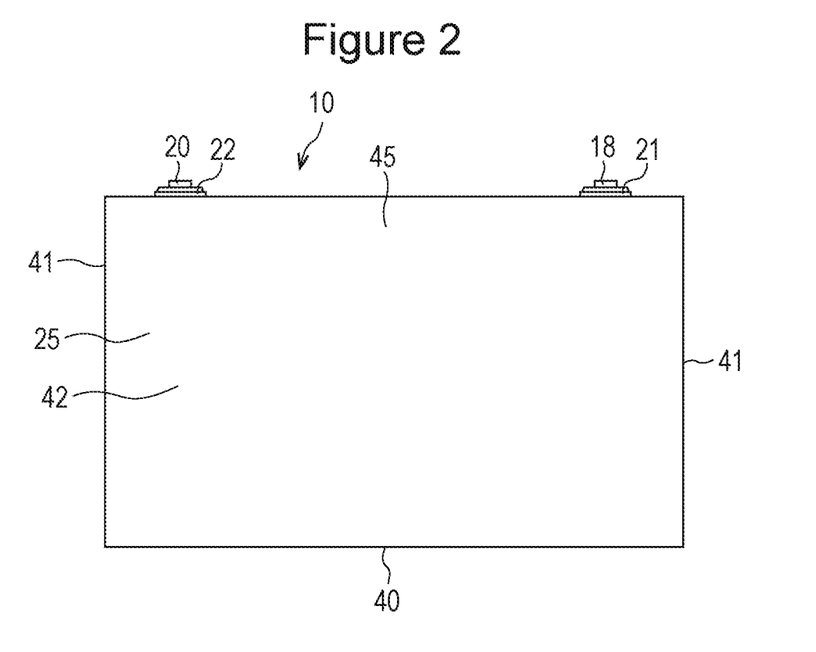
FIG. 2 is a front view of the prismatic secondary battery.
Figure 3A:
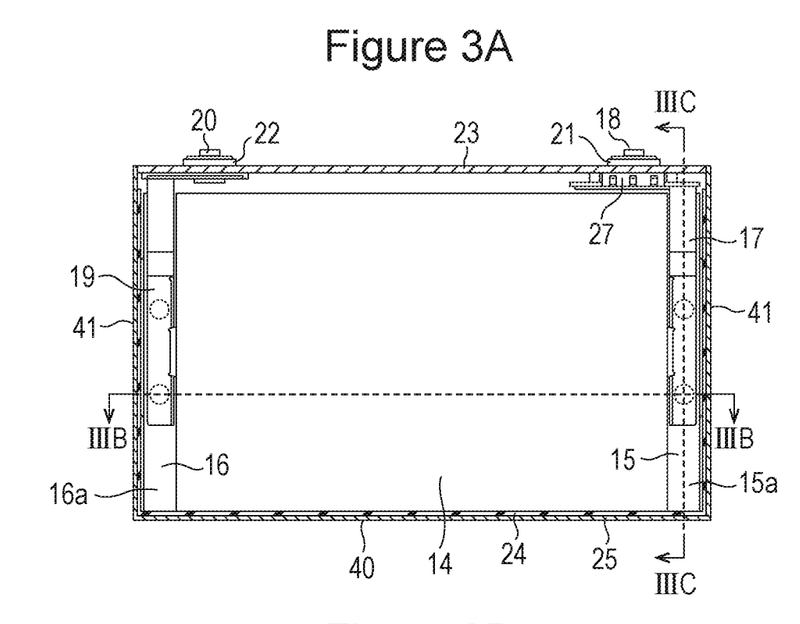
FIG. 3A is a cross-sectional view taken along line IIIA-IIIA in FIG. 1.
Figure 5:
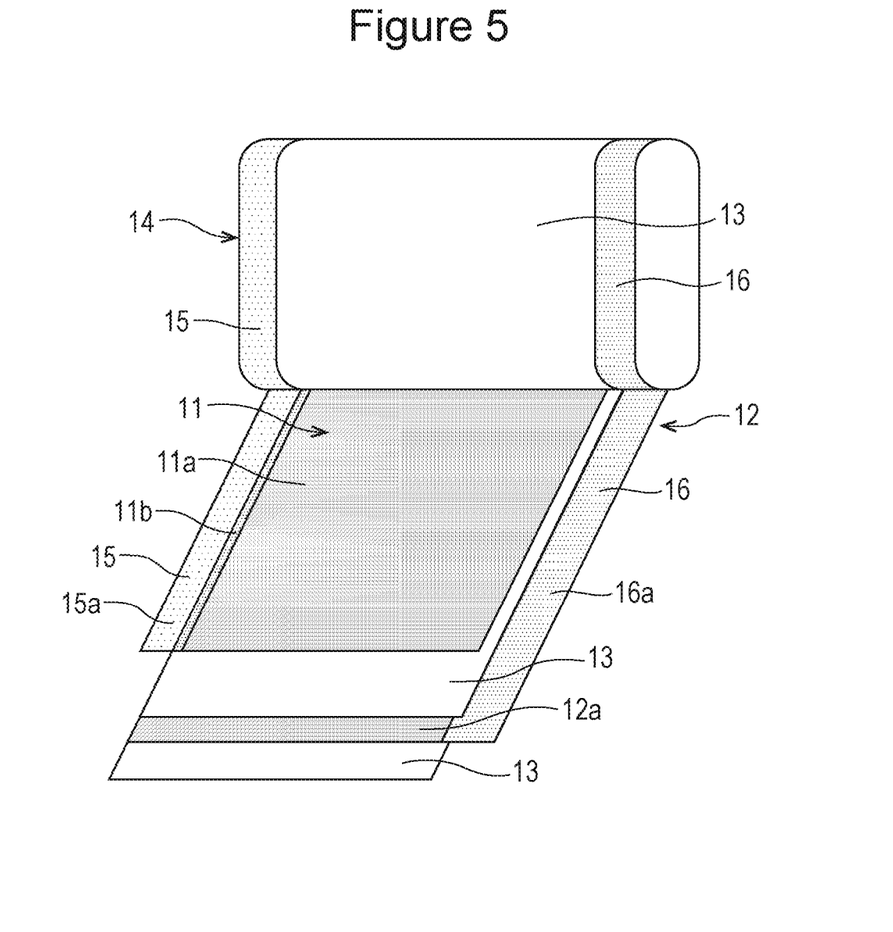
FIG. 5 is a perspective view of the flat wound electrode body of the prismatic secondary battery with the wound end portion unfolded.

As illustrated in FIG. 1 to FIG. 3 and FIG. 5, the prismatic secondary battery 10 includes a prismatic outer body (prismatic outer can) 25 (see FIG. 1 to FIG. 3), a sealing plate 23 (see FIG. 1), and the flat wound electrode body 14 (see FIG. 3A and FIG. 5). The prismatic outer body 25 is formed of, for example, aluminum or an aluminum alloy and has an opening at an end in a height direction. As illustrated in FIG. 2, the prismatic outer body 25 includes a bottom portion 40, a pair of first side surfaces 41, and a pair of second side surfaces 42. The second side surface 42 is larger than the first side surface 41. As illustrated in FIG. 3A, the sealing plate 23 is fitted to the opening of the prismatic outer body 25. The fitting portions of the sealing plate 23 and the prismatic outer body 25 are bonded together to form a prismatic battery case 45.

Figure 4A:
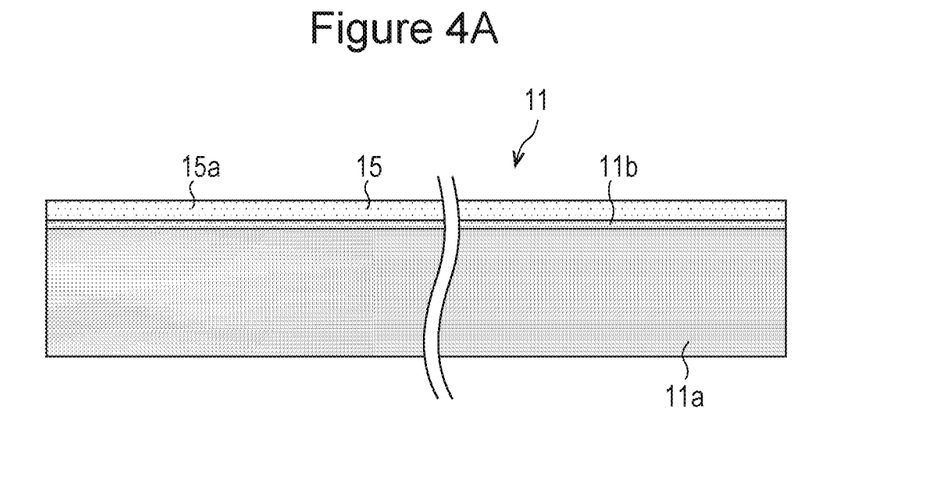
FIG. 4A is a plan view of the positive electrode included in the prismatic secondary battery.

As illustrated in FIG. 5, the wound electrode body 14 has a structure in which a positive electrode 11 and a negative electrode 12 are wound together in a state of being insulated from each other with a separator 13 disposed therebetween. The outermost surface of the wound electrode body 14 is covered with the separator 13, and the negative electrode 12 is disposed outward of the positive electrode 11. As illustrated in FIG. 4A, the positive electrode 11 is formed by applying a positive electrode active material slurry to both surfaces of a strip-shaped positive electrode substrate 15 formed of an aluminum foil or aluminum alloy foil of about 10 to 20 µm in thickness, performing drying and rolling, and thereafter, cutting the substrate into strips having predetermined dimensions. The positive electrode active material slurry contains, for example, a positive electrode active material, an electroconductive agent, and a binder. In such formation, a positive electrode substrate exposed portion 15a, which does not include a positive electrode active material layer 11a on either surface thereof in a longitudinal direction, is formed at one end of the positive electrode 11 in a width direction. On at least one surface of the positive electrode substrate exposed portion 15a, a positive electrode protecting layer 11b is preferably formed in the longitudinal direction of the positive electrode substrate exposed portion 15a so as to be adjacent to, for example, the positive electrode active material layer 11a. The positive electrode protecting layer 11b contains insulating inorganic particles and a binder. The positive electrode protecting layer 11b has lower electroconductivity than the positive electrode active material layer 11a. The positive electrode protecting layer 11b prevents a short circuit between a negative electrode active material layer 12a and the positive electrode substrate 15 that may be caused by, for example, a foreign object. The positive electrode protecting layer 11b may contain electroconductive inorganic particles. The positive electrode protecting layer 11b is not necessarily provided.

Figure 4B:
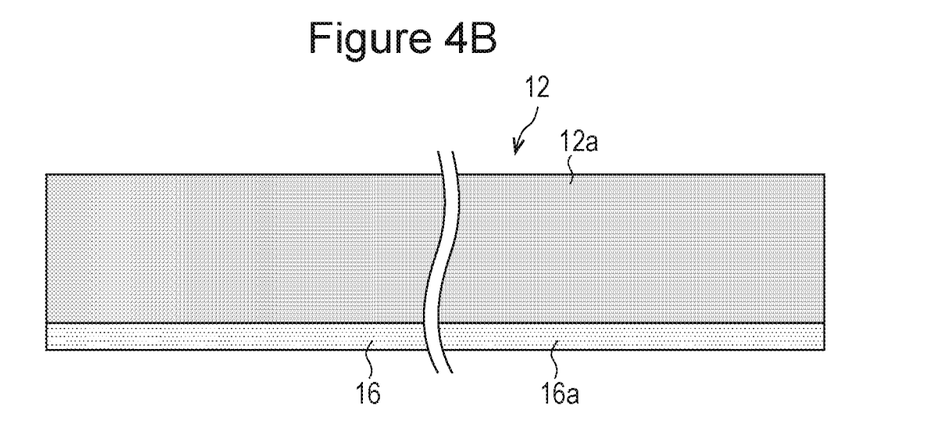
FIG. 4B is a plan view of the negative electrode included in the prismatic secondary battery.

On the other hand, as illustrated in FIG. 4B, the negative electrode 12 is formed by applying a negative electrode active material slurry to both surfaces of a strip-shaped negative electrode substrate 16 formed of a copper foil or copper alloy foil of about 5 to 15 µm in thickness, performing drying and rolling, and thereafter, cutting the substrate into strips having predetermined dimensions. The negative electrode active material slurry contains, for example, a negative electrode active material and a binder. In such formation, a negative electrode substrate exposed portion 16a, which does not include the negative electrode active material layer 12a on either surface thereof in a longitudinal direction, is formed. The positive electrode substrate exposed portion 15a and the negative electrode substrate exposed portion 16a may be formed along both ends of the positive electrode 11 in a width direction and along both ends of the negative electrode 12 in a width direction, respectively.

As illustrated in FIG. 5, the positive electrode 11 and the negative electrode 12 are offset from each other in the width direction of the wound electrode body 14 (width direction of the positive electrode 11 and the negative electrode 12) to prevent the positive electrode substrate exposed portion 15a and the negative electrode active material layer 12a from overlapping each other and to prevent the negative electrode substrate exposed portion 16a and the positive electrode active material layer 11a from overlapping each other. The positive electrode 11 and the negative electrode 12 are wound together in a state of being insulated from each other with the separator 13 disposed therebetween and are formed to be flat to produce the flat wound electrode body 14. The wound electrode body 14 includes the layers of the positive electrode substrate exposed portion 15a stacked on each other at one end portion in a direction in which the winding axis extends and the layers of the negative electrode substrate exposed portion 16a stacked on each other at the other end portion. The direction in which the winding axis extends is the same as the width direction of the strip-shaped positive electrode 11, the strip-shaped negative electrode 12, and the strip-shaped separator 13 when such electrodes and the separator are unfolded to form a rectangular shape. A microporous film made of polyolefin is preferably used as the separator 13. The separator 13 preferably has a width large enough to cover the positive electrode active material layer 11a and the positive electrode protecting layer 11b and preferably has a larger width than the negative electrode active material layer 12a.

The layers of the positive electrode substrate exposed portion 15a stacked on each other are electrically connected to a positive electrode terminal 18 via a positive electrode current collector 17 (see FIG. 3A), and the layers of the negative electrode substrate exposed portion 16a stacked on each other are electrically connected to a negative electrode terminal 20 via a negative electrode current collector 19 (see FIG. 3A), which will be described later. As illustrated in FIG. 3A, a current interruption device 27, which operates when the internal gas pressure of the battery case 45 increases to a predetermined value or higher, is preferably disposed between the positive electrode current collector 17 and the positive electrode terminal 18, which will not be described in detail.

As illustrated in FIG. 1, FIG. 2, and FIG. 3A, the positive electrode terminal 18 and the negative electrode terminal 20 are respectively fixed to the sealing plate 23 with insulating members 21 and 22. The sealing plate 23 includes a gas discharging valve 28, which opens when the internal gas pressure of the battery case 45 becomes higher than the operating pressure of the current interruption device 27. The positive electrode current collector 17, the positive electrode terminal 18, and the sealing plate 23 are each formed of aluminum or an aluminum alloy, and the negative electrode current collector 19 and the negative electrode terminal 20 are each formed of copper or a copper alloy. As illustrated in FIG. 3C, the flat wound electrode body 14, which is surrounded, except a portion near the sealing plate 23, by an insulating sheet (resin sheet) 24 having insulating properties, is inserted into the prismatic outer body 25 having an opening.

Figure 3B:
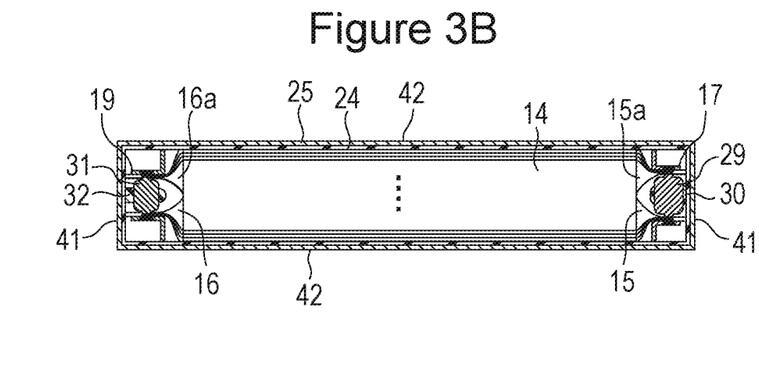
FIG. 3B is a cross-sectional view taken along IIIB-IIIB in FIG. 3A.
Figure 3C:
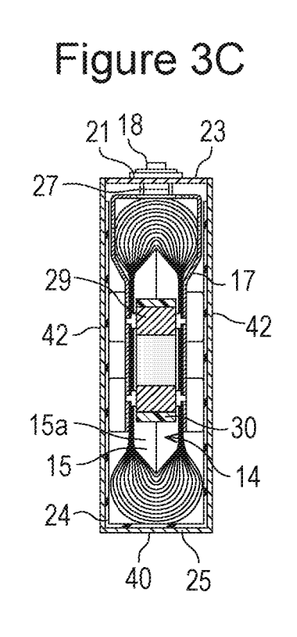
FIG. 3C is a cross-sectional view taken along line IIIC-IIIC in FIG. 3A.

As illustrated in FIG. 3B and FIG. 3C, the layers of the wound positive electrode substrate exposed portion 15a of the positive electrode 11, which are stacked on each other, converge toward the center portion in the thickness direction and are divided into two portions. The two portions each converge, and a positive electrode intermediate member 30 is disposed therebetween. The positive electrode intermediate member 30 is formed of a resin material. One or more, for example, two electroconductive positive electrode conductive members 29 are disposed on the positive electrode intermediate member 30. The positive electrode conductive member 29 may have a cylindrical shape and has a cone-like projection on each end thereof facing the layers of the positive electrode substrate exposed portion 15a stacked on each other.

The layers of the wound negative electrode substrate exposed portion 16a of the negative electrode 12, which are stacked on each other, converge toward the center portion in the thickness direction and are divided into two portions. The two portions each converge, and a negative electrode intermediate member 32 is disposed therebetween. The negative electrode intermediate member 32 is formed of a resin material. One or more, for example, two electroconductive negative electrode conductive members 31 are disposed on the negative electrode intermediate member 32. The negative electrode conductive member 31 may have a cylindrical shape and has a cone-like projection on each end thereof facing the layers of the negative electrode substrate exposed portion 16a stacked on each other.

The positive electrode conductive member 29 and the converged layers of the positive electrode substrate exposed portion 15a that are disposed at both ends of the positive electrode conductive member 29 in a direction in which the positive electrode conductive member 29 extends are electrically connected to each other by, for example, resistance welding. The converged layers of the positive electrode substrate exposed portion 15a and the positive electrode current collector 17 disposed outward of the positive electrode substrate exposed portions 15a in the depth direction of the battery case 45 are also electrically connected to each other by, for example, resistance welding. In the same manner, the negative electrode conductive member 31 and the converged layers of the negative electrode substrate exposed portion 16a that are disposed at both ends of the negative electrode conductive member 31 are electrically connected to each other by, for example, resistance welding. The converged layers of the negative electrode substrate exposed portion 16a and the negative electrode current collector 19 disposed outward of the negative electrode substrate exposed portion 16a in the depth direction of the battery case 45 are also electrically connected to each other by, for example, resistance welding. An end of the positive electrode current collector 17 that is away from the positive electrode substrate exposed portion 15a is electrically connected to the positive electrode terminal 18, and an end of the negative electrode current collector 19 that is away from the negative electrode substrate exposed portion 16a is electrically connected to the negative electrode terminal 20. As a result, the positive electrode substrate exposed portion 15a is electrically connected to the positive electrode terminal 18, and the negative electrode substrate exposed portion 16a is electrically connected to the negative electrode terminal 20.

The wound electrode body 14, the positive and negative electrode intermediate members 30 and 32, and the positive and negative electrode conductive members 29 and 31 form an integral structure by resistance welding. The positive electrode conductive member 29 is preferably made of aluminum or an aluminum alloy, which is the material of the positive electrode substrate 15, and the negative electrode conductive member 31 is preferably made of copper or a copper alloy, which is the material of the negative electrode substrate 16. The positive electrode conductive member 29 and the negative electrode conductive member 31 may have the same shape or different shapes.

Herein, resistance welding is performed to connect the positive electrode substrate exposed portion 15a and the positive electrode current collector 17 to each other and to connect the negative electrode substrate exposed portion 16a and the negative electrode current collector 19 to each other; however, laser welding or ultrasound welding may be performed. The positive electrode intermediate member 30 and the negative electrode intermediate member 32 are not necessarily used.

As illustrated in FIG. 1, the sealing plate 23 includes an electrolyte solution inflow hole 26. The wound electrode body 14 to which, for example, the positive electrode current collector 17, the negative electrode current collector 19, and the sealing plate 23 are attached is disposed in the prismatic outer body 25. The wound electrode body 14 is preferably inserted into the prismatic outer body 25 in a state of being disposed in the box-shaped or bag-shaped insulating sheet 24. Afterwards, the fitted portions of the sealing plate 23 and the prismatic outer body 25 are subjected to laser welding, and thereafter, a nonaqueous electrolyte solution is poured through the electrolyte solution inflow hole 26. Then, the electrolyte solution inflow hole 26 is sealed to produce the prismatic secondary battery 10. The electrolyte solution inflow hole 26 is sealed, for example, with a blind rivet or by welding.

The prismatic secondary batteries 10 or groups of the prismatic secondary batteries 10 are connected to each other in series, parallel, or mixture of both and used for various applications. When the prismatic secondary batteries 10 are connected to each other in series or parallel and used for, for example, vehicles, the prismatic secondary batteries 10 may each include a positive electrode external terminal and a negative electrode external terminal additionally and may be connected to each other with busbars. Here, a structure in which the wound electrode body 14 is disposed with the winding axis parallel to the bottom portion 40 of the prismatic outer body 25 is described; however, the wound electrode body 14 may be disposed with the winding axis perpendicular to the bottom portion 40 of the prismatic outer body 25. The electrode body may be a stacked-type electrode body.

The positive electrode active material may be appropriately selected from compounds that can bind and release lithium ions reversibly and is preferably a lithium transition metal composite oxide. For example, lithium transition metal composite oxides that can bind and release lithium ions reversibly and that are represented by $LiMO_2$ (M is at least one of Co, Ni, and Mn), such as $LiCoO_2$, $LiNiO_2$, $LiNi_yCo_{1-y}O_2$ (y=0.01 to 0.99), $LiMnO_2$, $LiCo_xMn_yNi_zO_2$ (x+y+z=1), $LiMn_2O_4$, and $LiFePO_4$, are used alone or in a combination of two or more. Furthermore, a lithium cobalt composite oxide to which a different metal element, such as zirconium, magnesium, aluminum, or tungsten is added may be used.

The solvent for a nonaqueous electrolyte is not particularly limited and may be a solvent that has been typically used for nonaqueous electrolyte secondary batteries. Examples of the solvent include cyclic carbonates, such as ethylene carbonate (EC), propylene carbonate (PC), butylene carbonate, and vinylene carbonate (VC); chain carbonates, such as dimethyl carbonate (DMC), methylethyl carbonate (MEC), and diethyl carbonate (DEC); ester-containing compounds, such as methyl acetate, ethyl acetate, propyl acetate, methyl propionate, ethyl propionate, and γ-butyrolactone; compounds containing a sulfone group such as propanesultone; ether-containing compounds, such as 1,2-dimethoxyethane, 1,2-diethoxyethane, tetrahydrofuran, 1,2-dioxane, 1,4-dioxane, and 2-methyltetrahydrofuran; nitrile-containing compounds, such as butyronitrile, valeronitrile, n-heptane nitrile, succinonitrile, glutaronitrile, adiponitrile, pimelonitrile, 1,2,3-propanetricarbonitrile, and 1,3,5-pentanetricarbonitril; and amide-containing compounds, such as dimethylformamide. In particular, such a compound is preferably used as a solvent, when hydrogen atoms thereof are partially substituted with fluorine atoms. Such compounds may be used alone or in a combination of two or more. In particular, a solvent containing a cyclic carbonate and a chain carbonate in combination or such a solvent further containing a little amount of nitrile-containing compound or ether-containing compound is preferred.

Furthermore, a known lithium salt that has been typically used for nonaqueous electrolyte secondary batteries may be used as a solute for the nonaqueous electrolyte. Such a lithium salt may contain one or more element of P, B, F, O, S, N, and Cl. Examples of the lithium salt include $LiPF_6$, $LiBF_4$, $LiCF_3SO_3$, $LiN(FSO_2)_2$, $LiN(CF_3SO_2)_2$, $LiN(C_2F_5SO_2)_2$, $LiN(CF_3SO_2)(C_4F_9SO_2)$, $LiC(C_2F_5SO_2)_3$, $LiAsF_6$, $LiClO_4$, and $LiPF_2O_2$ and mixtures thereof. In particular, to enhance the high-rate charging/discharging characteristics and the durability of the nonaqueous electrolyte secondary battery, $LiPF_6$ is preferably used. A lithium salt in which an oxalato complex, such as lithium bis(oxalate)borate (LiBOB), is contained as an anion may be used as the solute.

The above solutes may be used alone or in a combination of two or more. The concentration of the solute is not particularly limited and desirably 0.8 to 1.7 mol per liter of the nonaqueous electrolyte solution.

The negative electrode active material may be any material that can bind and release lithium ions reversibly. Examples of such a material include carbon materials, silicon materials, lithium metals, metals and alloy materials that form an alloy with lithium, and metal oxides. From the viewpoint of material costs, a carbon-based active material, such as natural graphite, synthetic graphite, mesophase pitch-based carbon fibers (MCF), mesocarbon microbeads (MCMB), coke, or hard carbon, is preferably used as the negative electrode active material. In particular, to enhance the high-rate charging/discharging characteristics, a carbon material produced by covering a graphite material with low crystalline carbon is preferably used as the negative electrode active material.

The separator is preferably formed of, for example, a polyolefin. A separator formed of polyethylene, a separator including a polypropylene layer formed on the polyethylene surface, or a polyethylene separator having a surface to which an aramid-based resin is applied may be used as the separator.

On the interface between the positive electrode and the separator or the interface between the negative electrode and the separator, a layer containing an inorganic filler that has been used may be formed. Examples of the filler include an oxide and a phosphate compound that contain one or two or more of titanium, aluminum, silicon, and magnesium, which have been used, and such an oxide and such a phosphate compound that have a surface treated with, for example, a hydroxide. The filler layer may be formed by a method in which a filler-containing slurry is applied directly to a positive electrode, a negative electrode, or a separator, or a method in which a sheet formed of a filler is bonded to a positive electrode, a negative electrode, or a separator.

Next, the structure of the positive electrode active material layer 11a and a method for producing the structure will be fully described.

The positive electrode active material layer 11a contains a positive electrode active material, a binder, and an electroconductive agent. As the positive electrode active material, the above-described materials may be used. Examples of the binder include fluororesins, such as polytetrafluoroethylene (PTFE) and polyvinylidene fluoride (PVdF), polyacrylonitrile (PAN), polyimides, acrylic resins, and polyolefins. Such resins may be used with a cellulose derivative, such as carboxymethyl cellulose (CMC) or a salt thereof, or a polyethylene oxide (PEO). The electroconductive agent contains a carbon material. Examples of the carbon material include carbon black, acetylene black, furnace black, KETJENBLACK, and graphite.

The positive electrode active material layer 11a contains a string-shaped agglomerate formed of fibrous carbons gathered and entangled with each other. Here, the agglomerate is defined as a string-shaped carbon aggregation that is formed of fibrous carbons gathered and entangled with each other and that has a length of 30 μm or more. The minimum outer diameter of the agglomerate is not limited and may be 10 nm or more, 20 nm or more, 30 nm or more, 50 nm or more, 100 nm or more, or 150 nm or more. The minimum outer diameter is preferably 40 nm or more. The agglomerate is formed of fibrous carbons gathered and entangled with each other to have a string shape, and thus has a hollow inside.

Figure 6:
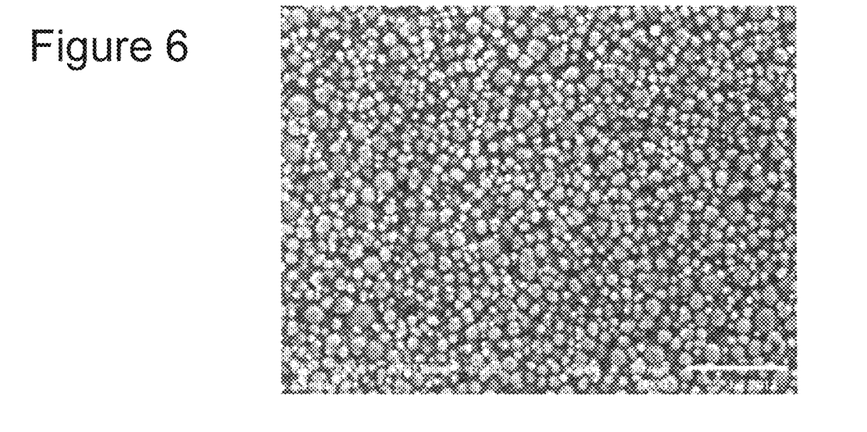
FIG. 6 is an image of a cross section of a positive electrode active material layer in Comparative Example 1 observed under a scanning electron microscope.
Figure 7A:
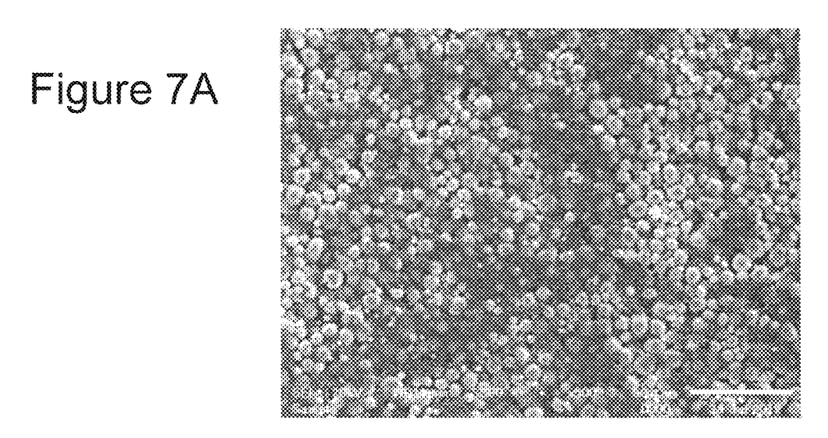
FIGS. 7A and 7B are each an image of a cross section of a positive electrode active material layer in Example 1 observed under a scanning electron microscope.
Figure 7B:
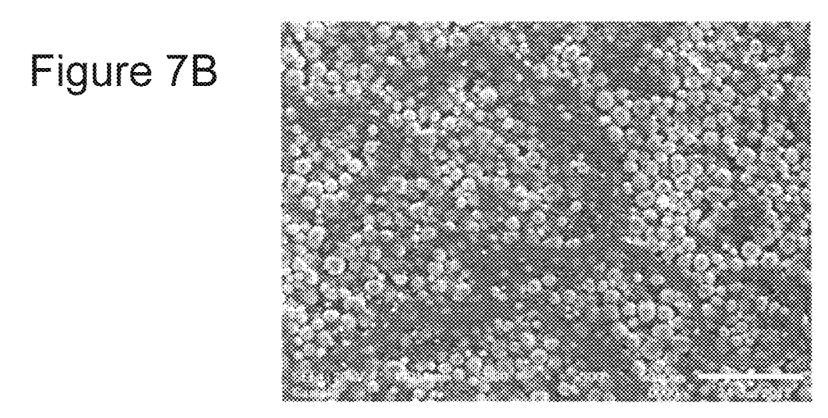

FIG. 6 is an image of a cross section of the positive electrode active material layer in Comparative Example 1, which will be described later, observed under a scanning electron microscope (hereinafter, SEM). FIGS. 7A and 7B are each an image of a cross section of the positive electrode active material layer in Example 1, which will be described later, observed under a SEM. In the image in FIG. 6, a string-shaped carbon aggregation is not confirmed. On the other hand, in the image in FIG. 7A, thick black string-shaped carbon aggregations are confirmed. In FIG. 7B, to easily observe string-shaped carbon aggregations, lines are drawn to show directions in which string-shaped carbon aggregations extend. Such string-shaped carbon aggregations are the agglomerates.

As shown in FIGS. 7A and 7B, many agglomerates have a branched portion. The outer diameter and the length of an agglomerate are determined in accordance with an image observed under a SEM. Specifically, the length of an agglomerate without a branched portion is defined as a distance from one end to the other end thereof that is determined in accordance with an image observed under a SEM. The length of an agglomerate with one or more branched portions is defined as a length of the longest portion of the agglomerate that is determined in accordance with an image observed under a SEM. The minimum outer diameter of an agglomerate is defined as a minimum width of the string-shaped agglomerate that is determined in accordance with an image observed under a SEM.

The number of agglomerates is not limited, provided that the number is 1 or larger. It is preferable that 650 to 3000 agglomerates be present per $mm^3$ of the positive electrode active material layer 11$a$, and that 20 to 90 agglomerates be present per $mm^2$ of the positive electrode active material layer. The agglomerates are preferably contained in the positive electrode active material layer 11$a$ in an amount of 1.0 to 5.0 mass % and more preferably 2.8 to 4.2 mass %. It is preferable that 10 mass % or more of the total agglomerates contained in the positive electrode active material layer 11$a$ be in contact with the positive electrode substrate 15. It is preferable that 30 mass % or more of the total agglomerates contained in the positive electrode active material layer 11$a$ have a branched structure. It is preferable that 10 mass % or more of the total agglomerates contained in the positive electrode active material layer 11$a$ have a length larger than the thickness of the positive electrode active material layer 11$a$. The effects of such features will be described later. It is not necessary that 10 mass % or more of the agglomerates be in contact with the positive electrode substrate 15, that 30 mass % or more of the agglomerates have a branched structure, and that 10 mass % or more of the agglomerates have a length larger than the thickness of the positive electrode active material layer 11$a$.

Next, a method for producing a positive electrode active material slurry used to produce the positive electrode active material layer 11$a$ containing such agglomerates will be fully described.

First, a first stirring step of mixing and stirring an active material, an electroconductive agent, a binder, and a dispersion medium to produce a temporary active material slurry is performed. The above-described materials may be used as the positive electrode active material, the electroconductive agent, or the binder. The dispersion medium is any dispersion medium that can disperse the positive electrode active material, the electroconductive agent, and the binder, and is suitably N-methyl-2-pyrrolidone (NMP). In the first stirring step, the positive electrode active material, the electroconductive agent, the binder, and the dispersion medium are mixed together and kneaded to disperse the positive electrode active material, the electroconductive agent, and the binder in the dispersion medium and to fragment a large aggregation of a carbon material used as the electroconductive agent into a number of small aggregations. In the first stirring step, the peripheral speed of the stirring blade of a kneader used for stirring may be set to 375 to 750 m/min, and stirring may be performed for, for example, 15 to 35 minutes. The amount of electroconductive agent added is suitably 4.0 to 8.0 mass % relative to the mass of the positive electrode active material. The amount of binder added is suitably 0.8 to 4.0 mass % relative to the mass of the positive electrode active material.

Next, a second stirring step is performed. In the second stirring step, the electroconductive agent and the dispersion medium are added to the temporary positive electrode active material slurry produced in the first stirring step and are stirred to produce the positive electrode active material slurry. In this way, the electroconductive agent is added separately, thereby suppressing fragmentation of a large aggregation of the carbon material of the electroconductive agent added later into small aggregations and rather fragmenting the large aggregation into medium-size aggregations. Such a medium-size aggregation is regarded as the agglomerate. In producing the positive electrode, the produced positive electrode active material slurry is used to produce the positive electrode active material layer containing the agglomerate.

The electroconductive agent added in the second stirring step may be different from the electroconductive agent added in the first stirring step; however, the electroconductive agent added in the second stirring step is preferably the same as the electroconductive agent added in the first stirring step. In the second stirring step, the dispersion medium is not necessarily added. In the second stirring step, the peripheral speed of the stirring blade of a kneader used for stirring may be set to 375 to 750 m/min, and stirring may be performed for, for example, 15 to 50 minutes. Regarding the amount of electroconductive agent added, the total mass of the electroconductive agent added in the second stirring step is preferably 0.8 to 1.2 times the total mass of the electroconductive agent added in the first stirring step and more preferably 0.9 to 1.1 times.

Next, effects of the active material layer according to the present disclosure will be described. The present inventors have found the following problems of a positive electrode produced by using a positive electrode active material slurry to which an electroconductive agent is added at a time.

Figure 8A:
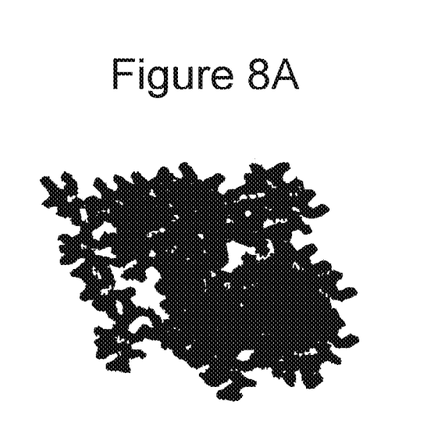
FIG. 8A is a view of a structure of electroconductive carbon.
Figure 8B:
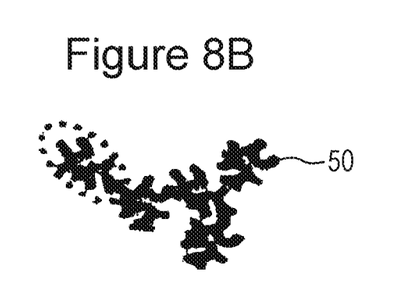
FIG. 8B is a view of an agglomerate.
Figure 8C:
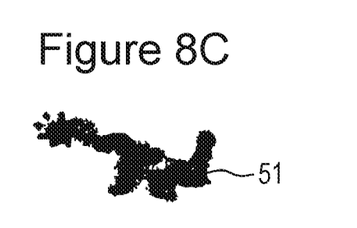
FIG. 8C is a view of an aggregate.
Figure 9:
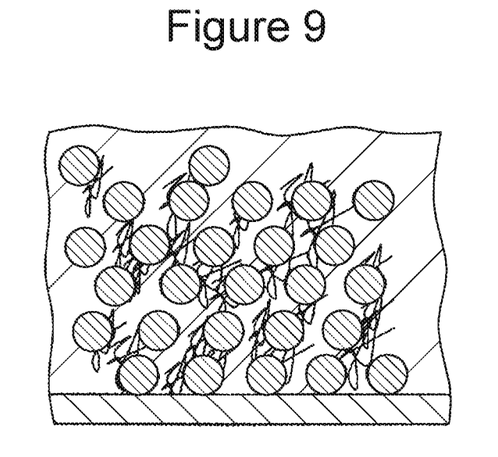
FIG. 9 is a schematic view of a structure of the positive electrode active material layer in Comparative Example 1.

Specifically, electroconductive carbon, such as acetylene black or furnace black, which is added, has a structure illustrated in FIG. 8A and is fragmented into smaller carbon material aggregations in sequence, such as condensed lumps, agglomerates 50 in FIG. 8B, and aggregates 51 (carbon material aggregation smaller than the agglomerate) in FIG. 8C, due to mechanical shear during kneading. Thus, if the electroconductive carbon is added at a time and kneaded for a long time during production of a positive electrode active material slurry, the electroconductive carbon is fragmented, in the positive electrode active material slurry, into aggregates that are small carbon material aggregations. Therefore, in a positive electrode produced by using the positive electrode active material slurry, as illustrated in FIG. 9, spaces between the positive electrode active material particles are filled with aggregates; however, spaces are formed between the aggregates, and thus, electronic conductivity in the positive electrode active material layer is likely to be degraded and battery power is likely to degrease.

Figure 10:
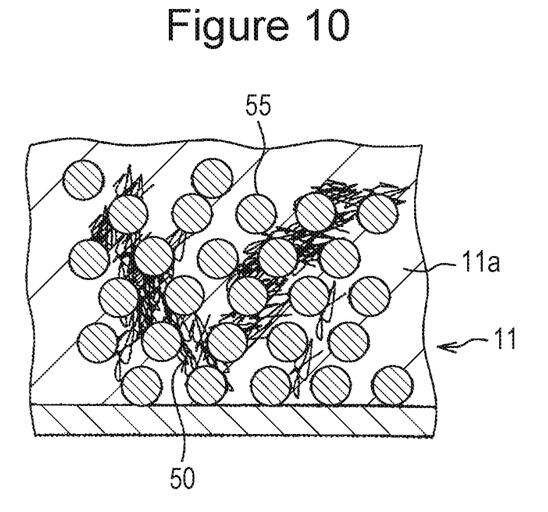
FIG. 10 is a schematic view of a structure of the positive electrode active material layer in Example 1.

On the other hand, many agglomerates remain in the positive electrode active material layer 11$a$ according to the present disclosure. Thus, electrons are likely to be collected via the string-shaped agglomerates 50 extending between many positive electrode active material particles 55, as illustrated in FIG. 10, thereby improving electronic conductivity in the positive electrode active material layer 11$a$ and increasing battery power.

Regarding the agglomerates, 650 to 3000 agglomerates per $mm^3$ of the positive electrode active material layer 11$a$ are likely to result in good electronic conductivity, and 20 to 90 agglomerates per mm$^2$ of the positive electrode active material layer are also likely to result in good electronic conductivity. The agglomerates are preferably contained in the positive electrode active material layer 11$a$ in an amount of 1.0 to 5.0 mass %. The agglomerates contained in an amount of 2.8 to 4.2 mass % is also likely to result in good electronic conductivity. When 10 mass % or more of the total agglomerates contained in the positive electrode active material layer 11$a$ are in contact with the positive electrode substrate 15, electrons transfers readily and smoothly between the positive electrode active material layer 11$a$ and the positive electrode substrate 15, and thus, collecting electrons, for example, is more efficiently performed. When 30 mass % or more of the total agglomerates contained in the positive electrode active material layer 11$a$ have a branched structure, aggregates or active materials are likely to be retained between the branches, and thus, electronic conductivity is further improved. When 10 mass % or more of the total agglomerates contained in the positive electrode active material layer 11$a$ have a length larger than the thickness of the positive electrode active material layer 11$a$, an agglomerate network is formed in the positive electrode active material layer 11$a$ in a wide range from the positive electrode substrate 15 to the surface of the positive electrode active material layer 11$a$, thereby forming a carbon-particle network that continuously extends from the positive electrode substrate 15 to the surface of the positive electrode active material layer 11$a$. Thus, electronic conductivity is further improved.

Hereinafter, with reference to Examples, the present disclosure will be further described. The present disclosure is not limited to such Examples.

Production of Positive Electrode
Production of Positive Electrode Active Material Slurry in Comparative Example A lithium transition metal composite oxide represented by LiNi$_{0.35}$Co$_{0.35}$Mn$_{0.3}$O$_2$ was used as the positive electrode active material. The positive electrode active material, carbon black that was the electroconductive agent, and PVdF that was the binder were mixed together, and an appropriate amount of NMP that was the dispersion medium was added thereto. Then, the mixture was kneaded to prepare a positive electrode active material slurry. The positive electrode active material, the electroconductive agent, and the binder were mixed together at a mass ratio of 91:6:3. All the amounts of positive electrode active material, carbon black, and PVdF were added at a time and kneaded with NMP to prepare a positive electrode active material slurry. The kneading time was set to 35 minutes, and the peripheral speed of the stirring blade of a kneader was set to 750 m/min. The mass ratio of the positive electrode active material, carbon black, and PVdF in Comparative Example 1 and that in Comparative Example 2 were changed such that the positive electrode active material slurry in Comparative Example 1 and the positive electrode active material slurry in Comparative Example 2 differ from each other.

Production of Positive Electrode Active Material Slurry in Example

The positive electrode active material slurry in Example 1 was produced in the same manner as that in Comparative Example 1, except that the amount of carbon black was divided in half and each half was added at a different time, and when a half amount of carbon black was added for the second time, NMP was added and kneaded again to perform kneading in two steps. The kneading time and the peripheral speed of the stirring blade of a kneader were the same as those in Comparative Example 1. In other words, in Example 1, the kneading time for the half amount of carbon black was half of the total kneading time in Comparative Example 1. The positive electrode active material slurry in Example 2 was produced in the same manner as that in Comparative Example 2, except that the amount of carbon black was divided in half and each half was added at a different time, and that when a half amount of carbon black was added for the second time, NMP was added and kneaded again to perform kneading in two steps. The kneading time and the peripheral speed of the stirring blade of a kneader were the same as those in Comparative Example 2, and as a result, also in Example 2, the kneading time for the half amount of carbon black was half of the total kneading time in Comparative Example 2.

Evaluation of Conductivity of Positive Electrode Active Material Slurry
Electrical Resistivity The electrical resistivity of the positive electrode active material layers produced by using the respective positive electrode active material slurries in Examples 1 and 2 and Comparative Examples 1 and 2 was measured by the four-point probe method. More specifically, each positive electrode active material slurry was applied to a PET film and dried. Thereafter, electrical resistivity was measured by the four-point probe method, and the results in Table 1 were obtained.

TABLE 1

| | Electrical resistivity ($\Omega \cdot$ cm) |
|---|---|
| Example 1 | 1.879 |
| Comparative Example 1 | 3.147 |
| Example 2 | 5.1 |
| Comparative Example 2 | 15 |

Battery Power

The positive electrode active material slurries produced in Example 1 and Comparative Example 1 were each applied to both surfaces of a positive electrode substrate formed of an aluminum foil of 15 μm in thickness. After dried, the coating was rolled with a roller. Thereafter, a strip having the positive electrode active material layer on each surface of the positive electrode substrate was cut into a positive electrode having a predetermined electrode size. A prismatic secondary battery was produced by using the positive electrode. The power of the produced prismatic secondary battery was measured, and the results in Table 2 were obtained.

TABLE 2

| | Power (W) |
|---|---|
| Example 1 | 1190 |
| Comparative Example 1 | 934 |

Superiority of Examples to Comparative Examples

The percentage decrease of the electrical resistivity in Example 1 relative to the electrical resistivity in Comparative Example 1, the percentage decrease of the electrical resistivity in Example 2 relative to the electrical resistivity in Comparative Example 2, and the percentage increase of the battery power in Example 1 relative to the battery power in Comparative Example 1 are as described below.
Percentage Decrease of Electrical Resistivity The percentage decrease of the electrical resistivity in example 1 relative to the electrical resistivity in Comparative Example 1 was calculated from the data as follows in Table 1 and was 40%.

[100−(electrical resistivity in Example 1/electrical resistivity in Comparative Example 1)×100]%= [100−(1.879/3.147)×100]%=40%

The percentage decrease of the electrical resistivity in Example 2 relative to the electrical resistivity in Comparative Example 2 was calculated from the data as follows in Table 1 and was 66%.

[100−(electrical resistivity in Example 2/electrical resistivity in Comparative Example 2)×100]%= [100−(5.1/15)×100]%=66%

Percentage Increase of Power

The percentage increase of the power in Example 1 relative to the power in Comparative Example 1 was calculated from the data as follows in Table 2 and was 27%.

[(power in Example 1/power in Comparative Example 1)×100−100]%=[(1190/934)×100−100]%=27%

As shown in the above calculations, in Examples, which differ from respective Comparative Examples basically only in that the electroconductive agent is added separately, the resistivity of the positive electrode active material layers is substantially decreased relative to that in respective Comparative Examples by 40% or more. In particular, the resistivity of the positive electrode active material layer in Example 2 is drastically decreased relative to that in Comparative Example 2 by 66%. It has been confirmed that the battery power in Example 1 is substantially increased relative to that in Comparative Example 1 by about 27%. The positive electrode active material layers produced by using the respective positive electrode active material slurries in Example 1 and Example 2 each contain a string-shaped agglomerate formed of fibrous carbons gathered and entangled. Thus, it is probable that electrons easily and smoothly transfer in the positive electrode active material layer and thus, the positive electrode active material layer has high electroconductivity. Therefore, the use of the positive electrode active material layer according to the present disclosure for a positive electrode and a prismatic secondary battery increases electronic conductivity and battery power.

The present disclosure is not limited to the above examples and modified Examples. Various improvements and modifications are available within the description and the range of equivalency of the claims of the present application.

For example, in the above embodiments, the electroconductive agent is separately added during formation of the positive electrode active material slurry to produce a positive electrode active material layer containing agglomerates. However, to produce a positive electrode active material containing agglomerates, two positive electrode active material slurries that are produced by using different kneaders and that differ from each other in kneading degree (i.e., two positive electrode active material slurries that differ from each other in the size of carbon material aggregations) may be mixed together and kneaded for a short term.

It has been described that forming agglomerates in the positive electrode active material layer results in a significant increase in the power of the prismatic secondary battery; however, agglomerates may be formed in the negative electrode active material layer. In such a case, in the same manner as in producing the positive electrode active material slurry, the negative electrode active material layer containing agglomerates is easily produced by adding the electroconductive agent separately. To produce the negative electrode active material slurry, carbon black, acetylene black, furnace black, KETJENBLACK, or graphite may be used as the electroconductive agent. A fluororesin, PAN, a polyimide resin, an acrylic resin, or a polyolefin resin may be used as the binder. Styrene-butadiene rubber (SBR) or a denaturant thereof may be preferably used as the binder. NMP may be suitably used as the dispersion medium.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. An electrode comprising:
   a substrate; and
   an active material layer disposed on at least one surface of the substrate,
   wherein the active material layer contains an active material, a binder, and an electroconductive agent,
   the active material layer contains, as the electroconductive agent, a string-shaped agglomerate formed of linearly connected carbon particles forming a plurality of fibrous carbons gathered and entangled with each other, and
   the agglomerate has a length of 30 μm or more.

2. The electrode according to claim 1, wherein the agglomerate has a minimum outer diameter of 40 nm or more.

3. The electrode according to claim 1, wherein 650 to 3000 of the agglomerates are present per $mm^3$ of the active material layer.

4. The electrode according to claim 1, wherein 20 to 90 of the agglomerates are present per $mm^2$ of the active material layer.

5. The electrode according to claim 1, wherein the agglomerates are contained in the active material layer in an amount of 2.8 to 4.2 mass %.

6. The electrode according to claim 1, wherein the active material layer contains a plurality of the agglomerates, and
   10 mass % or more of the total agglomerates contained in the active material layer are in contact with the substrate.

7. The electrode according to claim 1, wherein the active material layer contains a plurality of the agglomerates, and
   30 mass % or more of the total agglomerates contained in the active material layer have a branched structure.

8. The electrode according to claim 1, wherein the active material layer contains a plurality of the agglomerates, and
   10 mass % or more of the total agglomerates contained in the active material layer have a length larger than a thickness of the active material layer.

9. The electrode according to claim 1, wherein the substrate is a positive electrode substrate, and the active material layer is a positive electrode active material layer, and
   the electroconductive agent contains acetylene black.

10. A nonaqueous electrolyte secondary battery comprising the electrode according to claim 1.

11. A method for producing an electrode according to claim 1 comprising:

a first stirring step of mixing and stirring an active material, an electroconductive agent, a binder, and a dispersion medium to produce a temporary active material slurry, and a second stirring step of adding an electroconductive agent to the temporary active material slurry and performing stirring after the first stirring step.

12. The method for producing an electrode, according to claim 11, wherein the second stirring step includes adding a dispersion medium to the temporary active material slurry and performing stirring.

13. The method for producing an electrode, according to claim 11, wherein a total mass of the electroconductive agent added in the second stirring step is 0.9 to 1.1 times a total mass of the electroconductive agent added in the first stirring step.

14. The method for producing an electrode, according to claim 11, wherein the second stirring step is performed by using a kneader including a stirring blade, and a peripheral speed of the stirring blade is 375 to 750 m/min.

15. A method for producing a nonaqueous electrolyte secondary battery, the method comprising the method according to claim 11 for producing an electrode of a nonaqueous electrolyte secondary battery.

* * * * *